United States Patent [19]

Towns et al.

[11] Patent Number: 4,767,587
[45] Date of Patent: Aug. 30, 1988

[54] METHOD FOR MAKING A BREAK-AWAY CONTAINER CLOSURE

[75] Inventors: Edward J. Towns, Summit; Edward M. Brown, Livingston, both of N.J.

[73] Assignee: TBL Development Corporation, Livingston, N.J.

[21] Appl. No.: 851,741

[22] Filed: Apr. 17, 1986

Related U.S. Application Data

[63] Continuation-in-part of Ser. No. 697,962, Feb. 4, 1985, abandoned.

[51] Int. Cl.$^4$ .................. B65D 41/34; B29C 45/04
[52] U.S. Cl. .................. 264/318; 264/334; 425/438; 425/443; 425/809; 425/DIG. 109
[58] Field of Search .................. 264/152, 318, 334; 215/252; 249/59, 63; 425/438, 809, DIG. 59, DIG. 5

[56] References Cited

U.S. PATENT DOCUMENTS

| | | | |
|---|---|---|---|
| 2,162,711 | 6/1939 | Hamberger | 215/7 |
| 2,162,712 | 6/1939 | Hamberger | 215/7 |
| 2,162,752 | 6/1939 | Schauer | 215/42 |
| 2,162,754 | 6/1939 | Schauer | 215/7 |
| 3,409,710 | 11/1968 | Klygis | 264/152 X |
| 3,673,761 | 7/1972 | Leitz | 53/42 |
| 3,779,688 | 12/1973 | Jullien-Davin | 425/DIG. 5 X |
| 3,788,509 | 1/1974 | Keeler | 215/42 |
| 3,812,991 | 5/1974 | Wurl | 215/252 |
| 3,843,088 | 10/1974 | McLoughlin et al. | 425/DIG. 5 X |
| 3,924,769 | 12/1975 | Fillmore | 215/216 |
| 3,980,195 | 9/1976 | Fillmore | 215/256 |
| 4,033,472 | 7/1977 | Puchinger | 215/256 |
| 4,126,240 | 11/1978 | Birach | 215/252 |
| 4,280,976 | 7/1981 | von Holdt | 425/438 X |
| 4,343,754 | 8/1982 | Wilde et al. | 425/809 X |
| 4,465,651 | 8/1984 | Godschalk, Jr. et al. | 264/318 X |
| 4,497,765 | 2/1985 | Wilde et al. | 425/809 X |
| 4,526,282 | 7/1985 | Dutt et al. | 215/252 |

Primary Examiner—James Lowe
Assistant Examiner—James Bartholomew
Attorney, Agent, or Firm—Robin, Blecker & Daley

[57] ABSTRACT

Break-away closures are formed by an injection molding process with a closure part in interference path with a forming core for interference in use with a counterpart surface of a container neck. The process and apparatus disclosed permits stripping of the formed closure from the core by selectively creating free encircling space about the interference closure part for expansion thereof during stripping. The closure has detent surface molded therein which assists the stripping operation and the process and apparatus provide for the application of stripping forces at spaced locations simultaneously to permit stripping of the closure in part without axial loading thereof.

10 Claims, 12 Drawing Sheets

METHOD FOR MAKING A BREAK-AWAY CONTAINER CLOSURE

CROSS-REFERENCE TO RELATED APPLICATIONS

This application is a continuation-in-part of parent application, Ser. No. 697,962, now abandoned, filed on Feb. 4, 1985.

FIELD OF THE INVENTION

This invention relates generally to container closures and pertains more particularly to closures of so-called "break-away" type and methods and apparatus for making same.

BACKGROUND OF THE INVENTION

Certain segments of the container industry have looked, for security purposes, to break-away type closures, i.e., caps having a portion separable therefrom, which remains with the container to indicate initial container opening. For the separable cap portion to remain with the container, containers include a neck having a ridge in interference path with such separable cap portion, and the caps typically include a frangible section adjacent the separable portion, the separable portion itself projecting inwardly to so interfere.

Two approaches are noted in the prior art to providing the required interference between the container neck and the cap separable portion. A first practice involves molding a cap in such configuration that its separable portion does not interfere with the container neck upon threading of the cap onto the container. Then, heat is applied to the cap separable portion and it is deformed mechanically onto the container neck below a projecting ridge. This first practice, shown for instance in U.S. Pat. No. 3,673,761, has disadvantage in requiring a step after assembly, i.e., combined heat application and mechanical deformation. Further, as is noted in the '761 patent, the application of heat need be selectively controlled to protect the cap frangible section from distortion adversely affecting its later functioning.

A second practice involves the molding of a cap with its separable portion in radially inwardly projecting orientation to serve to interfere with the container neck ridge directly upon assembly. Such cap structure is seen, for example, in U.S. Pat. No. 2,162,712.

Since, in the latter practice, the closure separable portion is of lesser interior diameter than the remainder of the closure interior, removal of the cap from its forming core in manufacture presents some difficulty. Thus, stripping or unthreading of the cap from the core, in the absence of radially separable mold parts or collapsible cores, has not heretofore been accommodated to applicants' knowledge, for those plastics providing desired cap strength and hardness. Radial separation of mold parts has attendant disadvantages, e.g., same requires an additional time-consuming, profit-reducing step, and there are increased mechanism costs to effect mold part separation. Related disadvantages likewise attend the use of collapsible cores.

SUMMARY OF THE INVENTION

The present invention has as its primary object the provision of improved methods for making break-away container closures.

A more particular object of the invention is to provide apparatus for making break-away closures wherein a closure of this type and of such desired plastics composition is strippable from its forming core without requirement for radial separation of mold parts or collapsible cores.

In attaining these and other objects, the invention provides molding apparatus which implements a method for movement of a portion of a molded product having interfering surface with that of a forming core by application of stripping force to plural surfaces of the molded product at locations respectively aside the portion of the molded product. Considering the core as an axial member, the portion of the molded product is subjected to minimum, if any, axially directed force, and can expand radially without axial loading. Further, closure dimensions and core closure stripping angles are selected to minimize radial stresses on such closure portion.

In its specific application to break-away closure making, the molded product portion so stripped with its closure may comprise the frangible and separable sections of the closure. The apparatus of the invention, in preferred form, includes (1) an upper mold housing having a first mold cavity conforming to the exterior of the portion of the closure upwardly of its frangible section, (2) an outer sleeve member having a second mold cavity conforming to the exterior of the closure separable portion, (3) a core resident in both such cavities and having configuration corresponding to the interior of such closure upward portion, the closure frangible part and the closure separable portion, and (4) an inner sleeve disposed within the outer sleeve and having configuration defining the lowermost edge of the closure. A stripper plate is arranged between the upper mold housing and the outer sleeve.

In its more specific method, effected in operation of such molding apparatus, following completion of injection of melt and set of the injected material, the upper mold housing is separated from the formed closure. Then, the core, the stripper plate and the inner sleeve are displaced jointly, with the outer sleeve remaining fixed in its original position. This action displaces the closure from the first or forming stage, wherein the outer sleeve radially encircled the closure frangible section and separable portion, to a second stage wherein the separable portion may subsequently expand radially into encircling free space.

At this juncture, the core is fixed in its position and the inner sleeve and the stripper plate are jointly displaced relative to the core thereby applying pushing forces to the formed closure at locations below and above the frangible section of the formed closure. Such locations move axially simultaneously, thus eliminating axial forces on the displaced frangible section and separable portion as radial expansion into the encircling free space and initial stripping occur. In a final stage, the stripper plate is displaced alone, completing the stripping of the closure from the core. In this phase, the closure is freely withdrawable from the stripper plate by reason of prior action of the outer sleeve, as explained fully below in detailed description. The stripper plate, inner sleeve and core are now returned to their initial positions in readiness for the next cycle, the outer sleeve being in fixed position throughout.

The foregoing and other objects and features of the invention will be further understood from the following detailed description of preferred embodiments and

DESCRIPTION OF PREFERRED EMBODIMENTS AND PRACTICES

Figure 1:
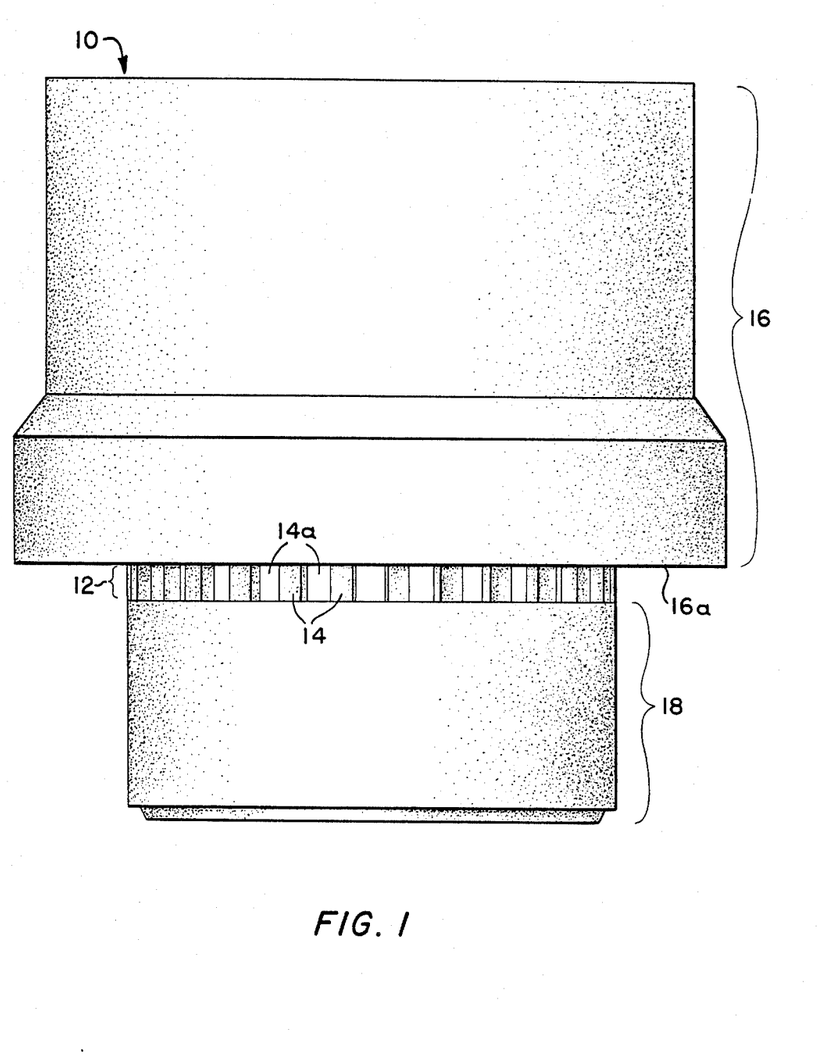
FIG. 1 is front elevation of a break-away closure in accordance with the invention.
Figure 2:
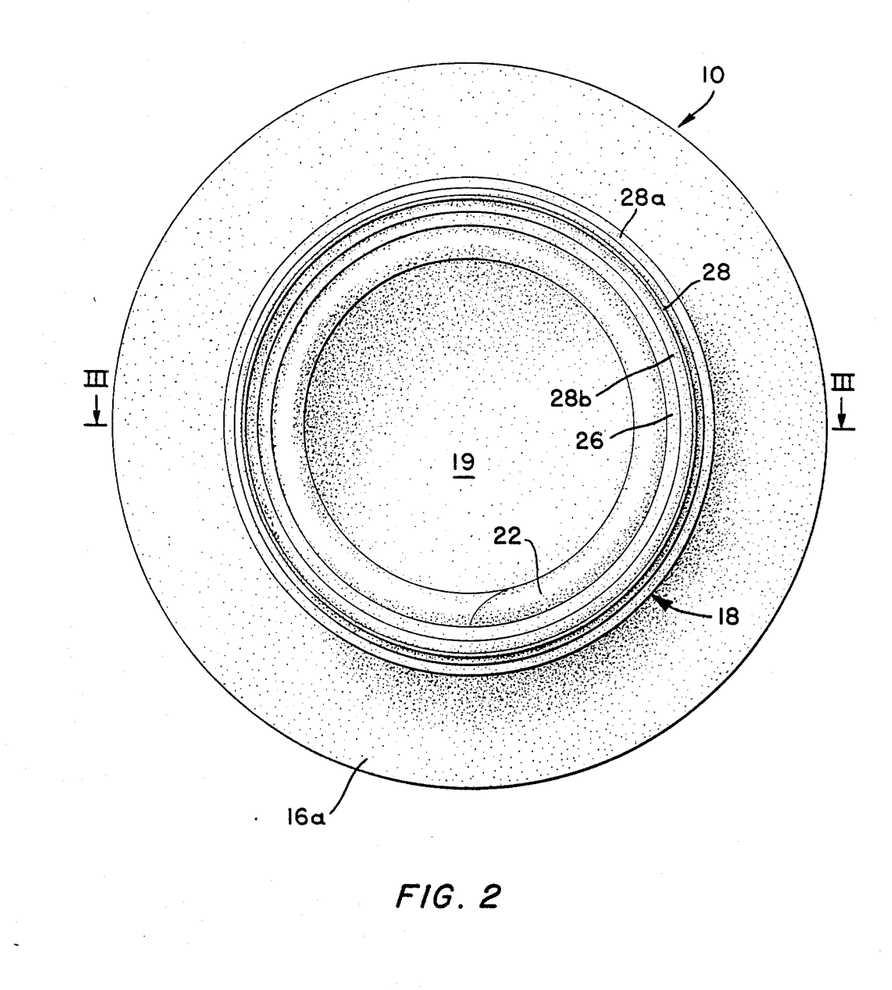
FIG. 2 is a bottom plan view of the FIG. 1 closure.
Figure 3:
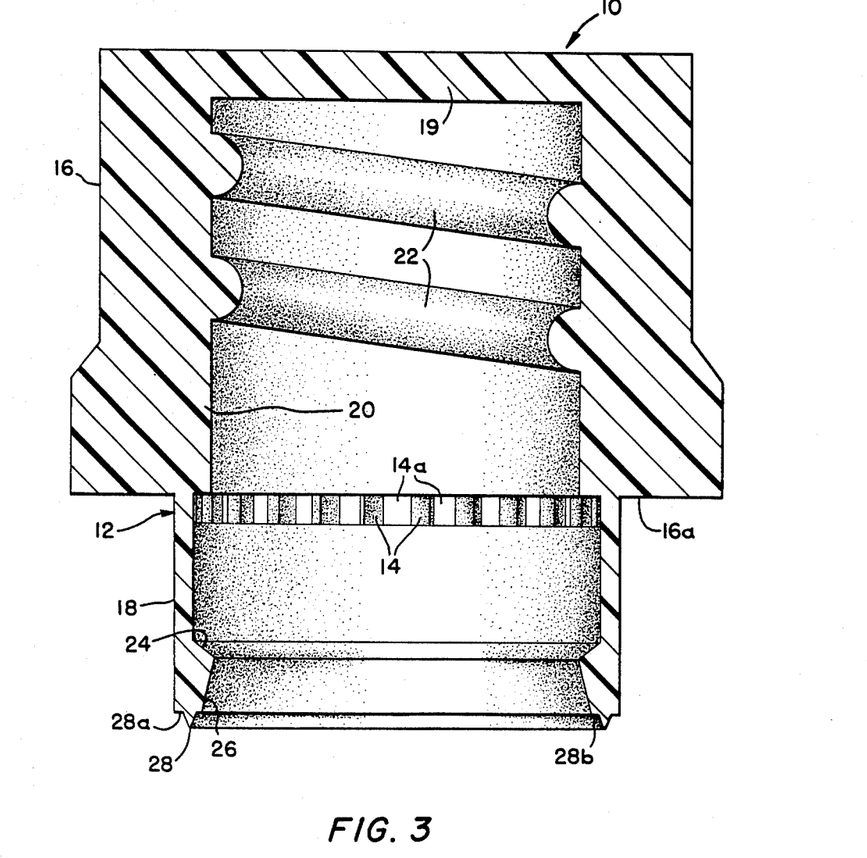
FIG. 3 is a sectional view of the FIG. 1 closure as would be seen from plane III—III of FIG. 2.

Referring to FIGS. 1-3, closure or cap 10 includes a frangible section 12 having ribs 14 with open spaces 14a therebetween, a portion 16 extending upwardly of ribs 14 and a lower portion 18, depending downwardly from ribs 14.

Upper closure portion 16 comprises top panel 19, skirt 20 and interior threading 22. Lower portion 18 has a radially inwardly extending ledge 24 inclined only slightly off the horizontal to interfere with complemental container neck structure to disrupt frangible section 12 upon opening sense rotation of upper portion 16. Lower portion 18 is thus a closure separable portion, staying with the container neck.

Lower closure portion 18 tapers interiorly in conical surface 26 radially outwardly at a steep angle to the horizontal to facilitate manufacture in accordance with the invention, as discussed below. At its bottom margin, lower portion 18 has a depending generally V-shaped projection 28, with flat surfaces 28a and 28b thereaside, also for purposes below discussed.

Figure 4:
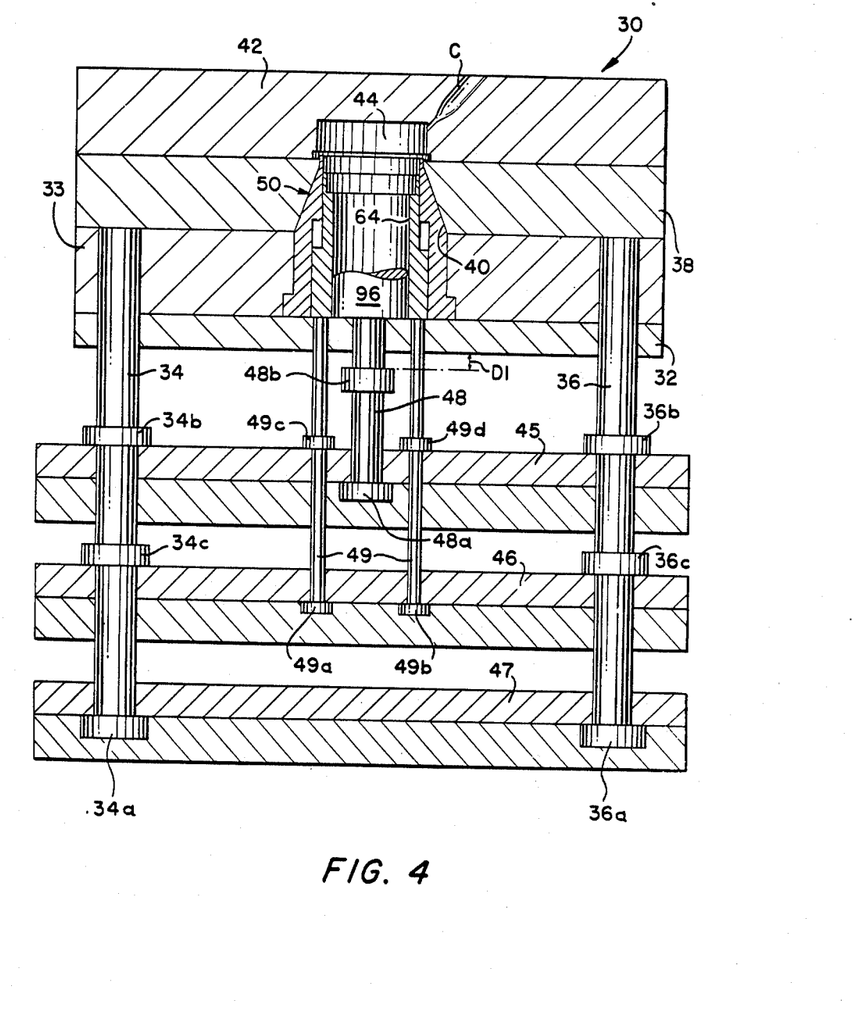
FIG. 4 is a front elevation of a molding machine in accordance with the invention in a first stage, with the forming core shown only in part to facilitate description.

Molding machine 30 of FIG. 4 is an embodiment of apparatus for use in making the closure of FIGS. 1-3. Base 32 is fixedly positioned and supports shafts 34 and 36, for movement. Stripper plate 38 is secured to the upper ends of shafts 34 and 36 and defines a conical opening centrally therethrough, bounded by interior surface 40. Upper mold housing 42 is movable vertically into and from its illustrated closure forming position and defines interior first mold cavity 44, conforming to the exterior surface of upper closure portion 16. Housing 42 also has channel C for melt conveyance.

Plate assemblies 45 and 46 are movable along shafts 34 and 36 and plate assembly 47 is secured to the lower ends of shafts 34 and 36. The plate assemblies each comprise a pair of individual plates secured together and having facility for receipt and retention of rod steps. Thus, plate 45 retains end step 48a of core shaft 48, plate 46 retains end steps 49a and 49b of push rods 49, and plate 47 retains steps 34a and 36a of shafts 34 and 36.

Figure 5:
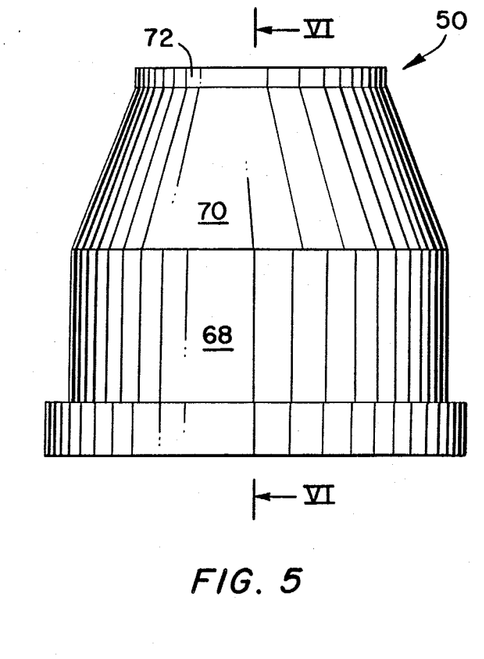
FIG. 5 is a front elevation of the exterior sleeve member of FIG. 4.
Figure 6:
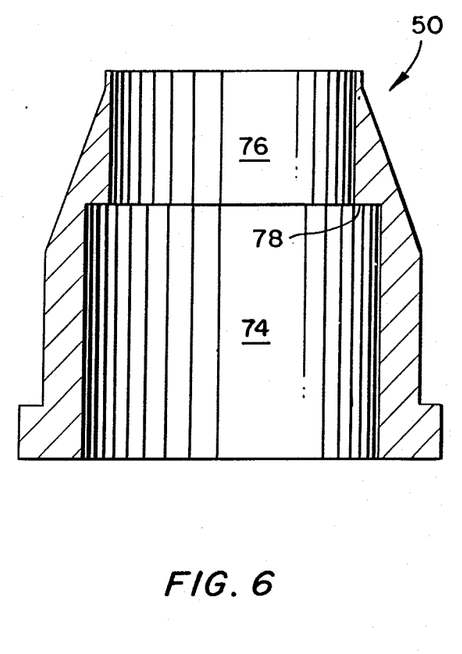
FIG. 6 is a sectional view of the FIG. 5 sleeve member as would be seen from place VI—VI of FIG. 5.

The exterior outline of exterior sleeve member 50 is seen in FIG. 5, i.e., a cylindrical lower course 68, a frustor-conical course 70 and an upper cylindrical course 72. Interiorly, as is shown in FIG. 6, sleeve member 50 has lower bore 74 and upper bore 76, defining the above-mentioned second mold cavity and being of reduced diameter, shoulder 78 being thereby defined. Member 50 is maintained in fixed relation with base 32 by retaining structure 33 (FIG. 4).

Figure 7:
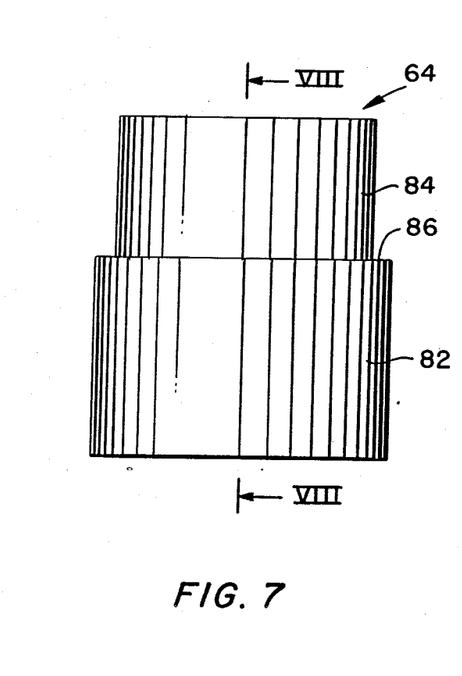
FIG. 7 is a front elevation of the interior sleeve member of FIG. 4.
Figure 8:
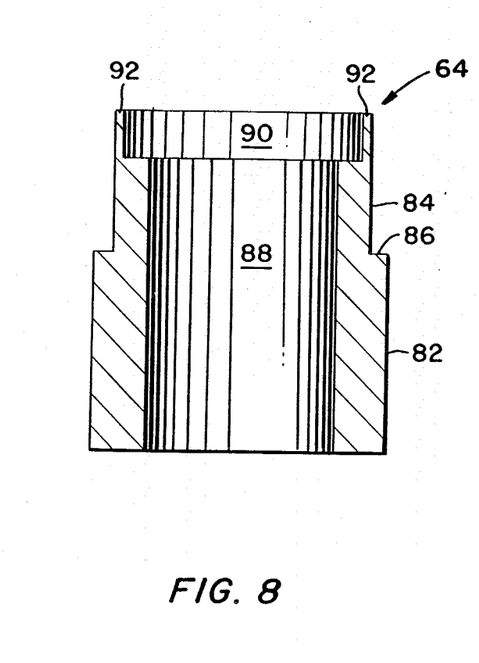
FIG. 8 is a sectional view of the FIG. 7 sleeve member as would be seen from plane VIII—VIII of FIG. 7.

Interior sleeve member 64 (FIG. 7) has cylindrical outer surfaces 82 and 84 of respective different diameters, thus defining shoulder 86. Interiorly (FIG. 8), sleeve member 64 has first diameter bore 88 and second larger diameter bore 90. At its upper end margin, sleeve member 64 defines a V-shaped groove 92, complemental to V-shaped projection 28 of closure 10, shown in FIG. 10 in larger scale. Member 64 is fixedly secured to push rods 49 of FIG. 4.

Figure 9:
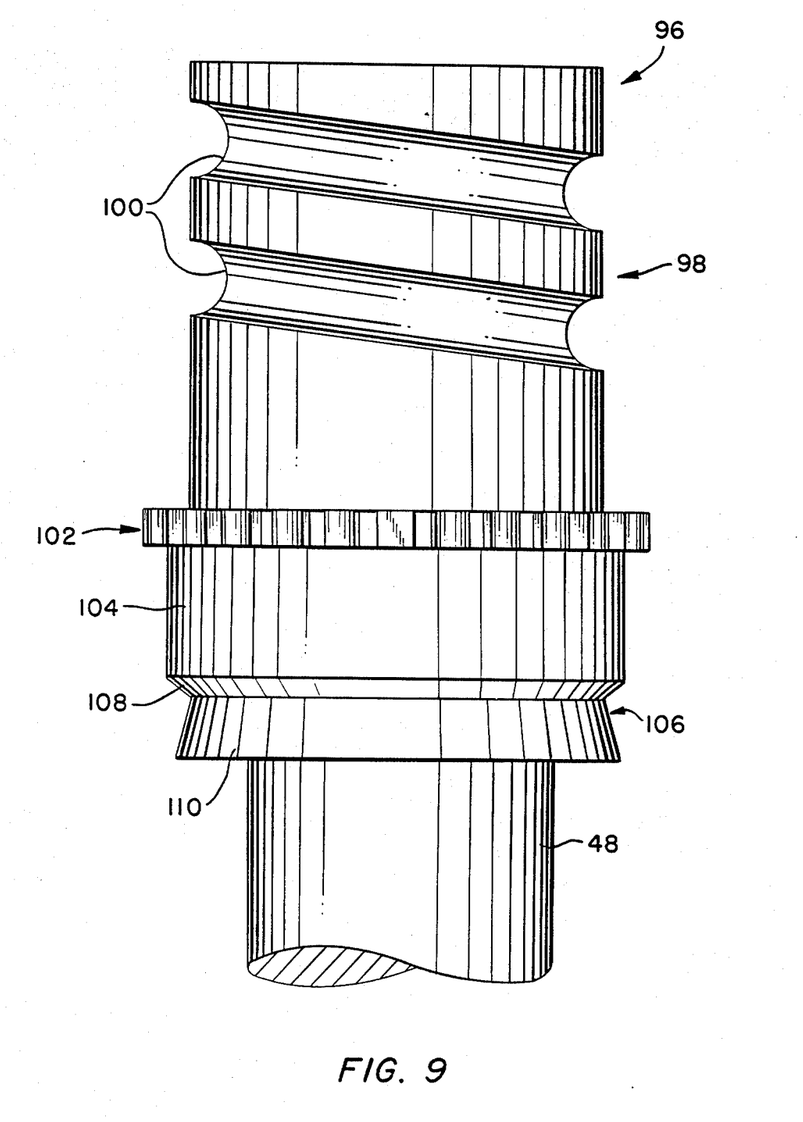
FIG. 9 is a front elevation of a forming core for use in the FIG. 4 apparatus.

For convenience of presentation, the FIG. 4 apparatus does not include a full showing of the core 96 but same is shown in FIG. 9, as including upper closure interior forming part 98 having threading-defining elements 100, frangible part-defining section 102, stem 104 and section 106 with ledge-former 108 and seating-former 110. Core shaft 48 extends below seating-former 110.

In the FIG. 4 stage (first stage) of apparatus 30, melt is injected and the closure is formed. To be noted (FIG. 10) is that cylindrical end course 72 of outer sleeve 50 both intervenes, i.e., lies between, stripper plate 38 and core 96 and has partial residence in upper mold cavity 44. In the next stage (second stage), shown completed in FIG. 4A, and practiced following set of the injected material, upper mold housing 42 is displaced vertically upwardly from its FIG. 4 position, opening the mold. Plate 45 is now displaced upwardly from its FIG. 4 position, moving also plate 46 with steps 49c and 49d of push rods 49, and plate 47 and shafts 34 and 36, based on engagement of plate 45 with steps 34b and 36b thereof.

Figure 4A:
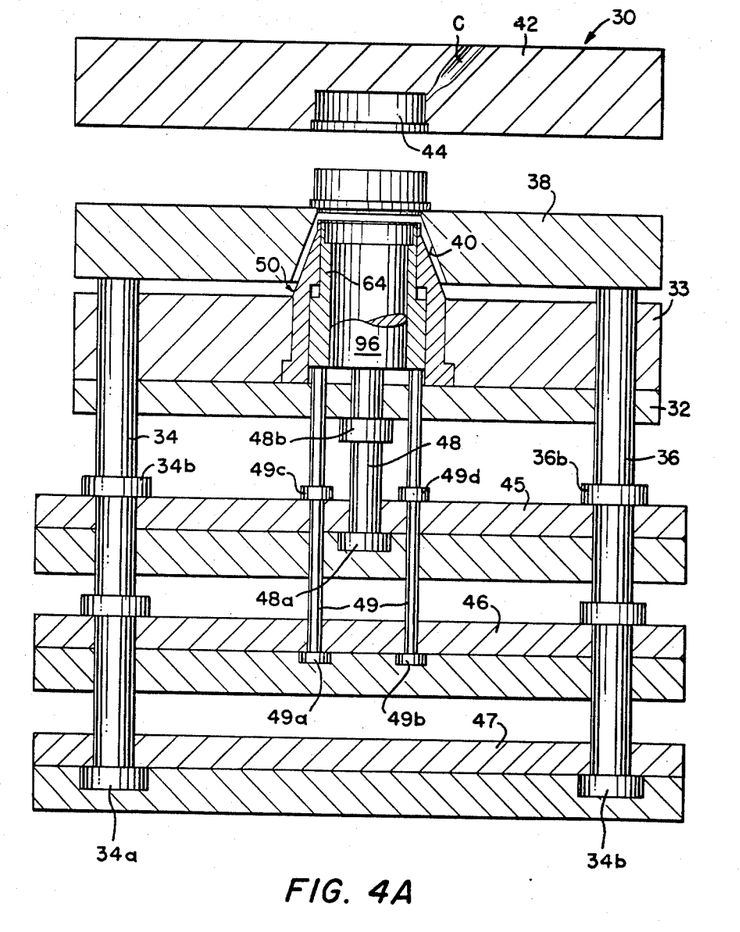
FIG. 4A is a repeat showing of the FIG. 4 machine in a second stage of its operation.

This upward movement is of measure D1 (FIG. 4), since step 48b of core shaft 48 then abuts fixed base 32. Stripper plate 38, core 96 and inner sleeve 64 are thus jointly moved upwardly by measure D1 relative to fixed outer sleeve 50, giving rise to the FIG. 4A showing. The formed closure, previously encircled at its frangible section and lower portion by sleeve 50, now has free space radially encircling same and may radially expand during subsequent stripping, as in the third stage now discussed.

Figure 4B:
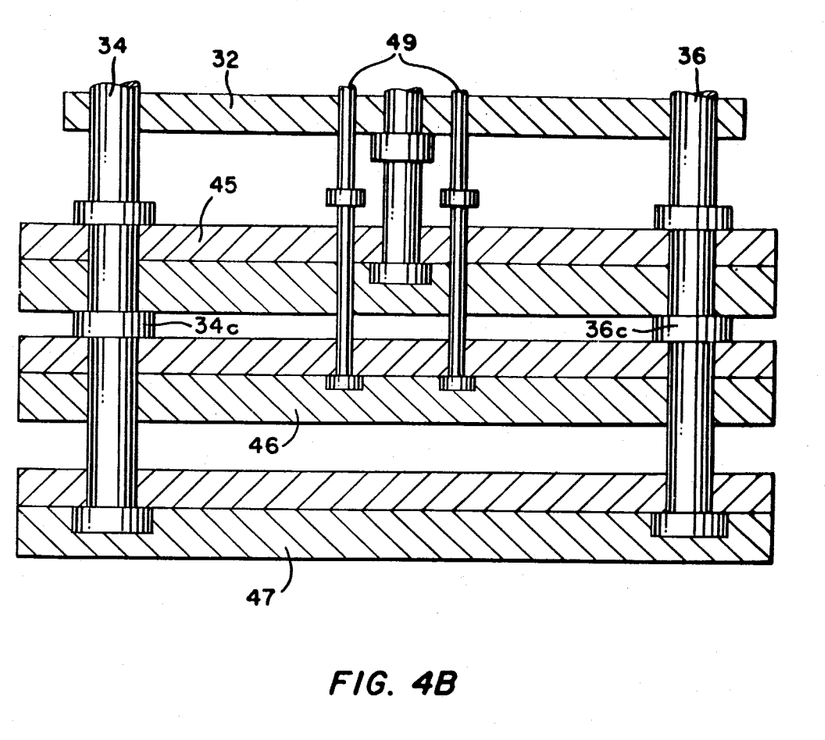
FIG. 4B is a repeat partial showing of the FIG. 4 machine in a third stage of its operation.

In the third stage, plate 46 is displaced upwardly and moves therewith plate 47, based on engagement of plate 46 with shaft 34c and 36c. This movement continues to the juncture shown in FIG. 4B, i.e., until 34c and 36c abut plate 45, which is stationary in the third stage. The activity in this stage is that core 96 is stationary and inner sleeve 64 and stripper plate 38 move jointly upward, applying pushing forces to the formed closure at mutually spaced locations, thus moving the closure frangible section and separable portion jointly simultaneously without axial loading thereof. Based on radially outward displacement of ledge 24 (FIG. 3) by the core, the separable portion expands radially into the encircling free space created in the second stage and becomes free of the core interfering surface.

In a last or fourth stage, plate 47 is moved upwardly and stripper plate 38 completes the stripping of the closure from the core. Based on the above-noted dual functioning of outer sleeve 50 of intervening stripper plate 38 and core 96 and first stage residence in cavity 44, stripping occurs without likelihood of entrapment of the molded product by stripper plate 38. Thus, expansion of the molded product may occur into the void created therein by first stage residence of outer sleeve end course 72, in measure still leaving spacing as between stripper plate 38 and the molded product. If one envisions the molding machine in position inverted from that shown in FIGS. 4 and 10, the provisions at hand would insure that the molded product would simply fall out of the machine, once it is free of the core. The parts of apparatus 30 are then returned to their FIG. 4 positions in readiness for producing another closure.

Figure 10:
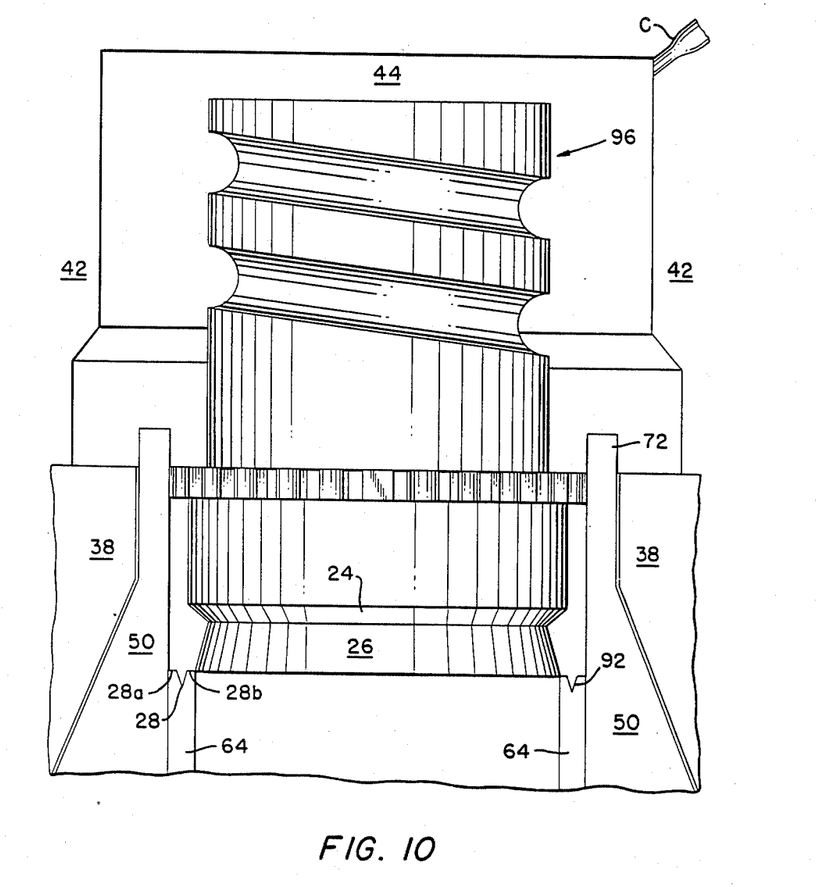
FIG. 10 is an enlarged partial view of all operative molding components in the first stage of operation of the FIG. 4 machine.

Referring to FIG. 10, all operative molding parts are in first or product forming state. Of particular note is that the V-shaped notch 92 of sleeve 64 is in a detenting or capturing relation with now-formed V-shaped extremity 28 of the formed closure. In the course of the third stage activity discussed above, i.e., movement of both sleeve 50 and core 96, such detent feature functions to effect a keeping of interengagement between sleeve 64 and the formed closure under the forces at hand in urging the separable portion of the closure over the interfering surfaces of core 96. Of further note is the taper and degree of taper of surface 26, which facilitates such functioning of detent notch 92.

Figure 11:
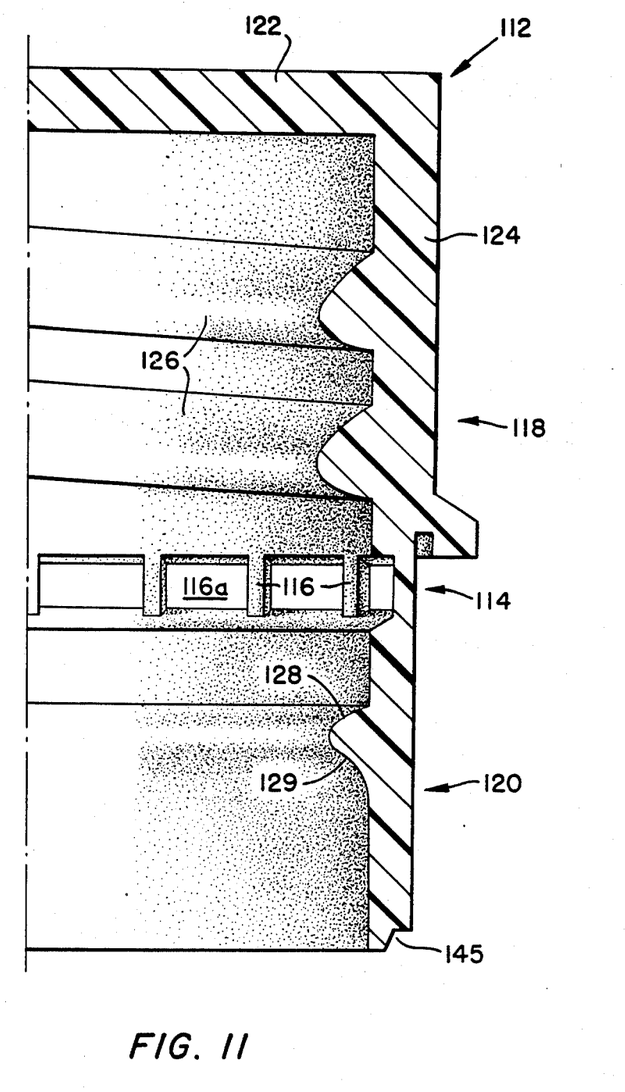
FIG. 11 is a partial sectional and enlarged view of a second closure embodiment in accordance with the invention.
Figure 12:
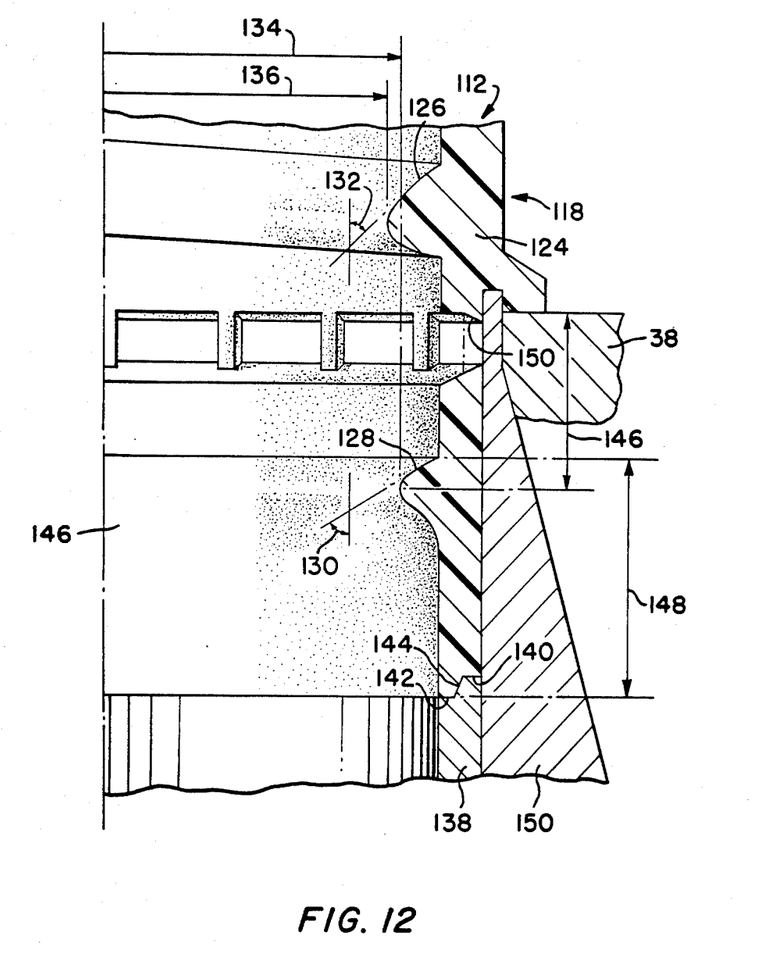
FIG. 12 is a partial and enlarged view of the FIG. 11 closure, shown in section and with the forming core thereof and other closure making elements in place and shown in full.

Turning to FIGS. 11 and 12, closure 112, a further embodiment in accordance with the invention, includes a frangible section 114 having ribs 116 with open spaces 116a therebetween, a portion 118 extending upwardly of ribs 116 and a lower portion 120, depending downwardly from ribs 116.

Upper closure portion 118 comprises top panel 122, skirt 124 and interior threading 126. Lower portion 120 has a radially inwardly extending arcuate surface 128, inclined at angle 130 to the vertical, e.g., about sixty degrees, to interfere with complemental container neck structure to disrupt frangible section 114 upon opening sense rotation of upper portion 118.

Threads 126 are inclined at angle 132 to the vertical, and this angle is less than that above noted as angle 130, angle 132 being about forty-five degrees. The inner diameter 134 of the crest of arcuate surface 128 is greater than the inner diameter 136 of threads 126.

Stripper plate 38 and exterior sleeve member 50 are configured as in the case of FIGS. 1–10. However, core 137 differs from core 96 as is illustrated and interior sleeve member 138 is differently configured from counterpart member 64 of FIG. 7. Thus, member 138 defines at its upper end a detent having vertically spaced flat surface expanses 140 and 142 with detent transition course 144 at radially interior ends of the flat surface expanses. Closure member lower portion 120 has formed end recessed configuration 145 corresponding to the member 138 detent (140–144), which is coactive with core 137 in the third stage activity above to effect a keeping engagement between sleeve member 138 and the formed closure under the aforesaid forces at hand in urging closure separable portion 120 over the interfering surfaces of core 137.

The embodiment of FIGS. 4, 4A and 4B may again be used. The distance 146 between the crest of surface 128 and the top of frangible section 114 is selected to be less than the distance 148 between flat 142 of member 138 and the top of surface 128. This provides that the crest of surface 28, i.e., its most radially interior portion, rides beyond core cut 150 upon uppermost travel of inner sleeve member 138, thereby to be on further inward travel during final stripping. The angles noted at 130 and 132 and diameters 134 and 136 provide further that portions 118 and 120 expand radially in the course of stripping at the same rate, thereby to minimize radial forces on frangible portion 114.

In its product aspect, the invention will be seen to provide a break-away closure for a container, comprising a molded body having an upper portion, a lower portion and a frangible section interconnecting the upper and lower portions. The lower portion has at an exterior surface thereof a projection enterable into detent apparatus employed in both forming and effecting release of the body therefrom in such molding thereof. The detent comprises an indentation in the forming apparatus and the projection may be in the configuration of a V-shaped projection having flat surface expanse on both sides thereof, as per showing 28 above or such as the sidewardly opening recessed configuration shown at 145. The projection is at the closure lower exterior surface, such as the lowermost closure extremity. As will be appreciated, the closure may reversely include the detent and the forming apparatus include the projection to effect the desired keeping function during closure forming.

The body lower portion further includes first radially interiorly extending tapered interior surface as at 24 and 128 above and second radially exteriorly extending tapered interior surface as at 26 and 129 above, located between a frangible portion and the detent. Viewing the body as upstanding, the degree of taper from horizontal of surface 24 is substantially less than the degree of taper from horizontal of surface 26.

In an apparatus aspect, the invention will be seen to provide apparatus for making a container closure, comprising: a housing as at 42 having a first mold cavity conforming to the exterior of an upper portion of the closure; a first or outer sleeve member 50 defining a second mold cavity and having interior surface conforming to one part of the exterior of a lower portion of the closure and a second or inner sleeve member 64 having interior surface conforming to another part of such closure lower portion exterior (projection 28, recess 145); a core 96, 137 resident in the first and second molding cavities and in the first and second sleeve members and having configuration corresponding to the interior of such closure upper and lower portions; and translation mechanism for effecting mutual displacement among the first sleeve member, the second sleeve member and the core. The translation mechanism is operative separately for displacing the inner sleeve member and stripper plate relative to the outer sleeve member and the core and for displacing the inner sleeve member and stripper plate jointly with the core relative to the outer sleeve member. Further, the stripper plate is movable individually in final stripping activity. In illustrated rendition, the apparatus has its first sleeve member is in circumscribing relation to the second sleeve member.

Various changes to the depicted and discussed embodiments and practices may be made without departing from the invention. The preferred embodiments and practices above are thus intended in an illustrative and not in a limiting sense. The true spirit and scope of the invention is set forth in the ensuing claims.

We claim:

1. A method for making a generally cylindrical break-away closure having an upper interiorly threaded portion, a frangible section depending from said upper portion and a separable portion depending axially from said frangible section, said method comprising the steps of:
    (a) defining a first mold cavity conforming to the exterior of said closure upper portion;
    (b) defining a second mold cavity conforming to the exterior of said closure frangible section and separable portion;
    (c) configuring a core with exterior surface forming such interior thread, forming ribs and open spaces between said ribs in said frangible section and forming said separable portion, such core surface being shaped to provide said separable portion with an axial extent and a radially interiorly extending ledge inclined relative to the axis of said closure and adapted to interfere with a container;
    (d) disposing said core in said first and second mold cavities;
    (e) injecting closure-forming matter into said first and second mold cavities to form a closure on said core;
    (f) creating free space in said second mold cavity radially outwardly of the frangible section and separable portion of a formed such closure; and
    (g) stripping said closure from said core in part by displacing said axial extent of said separable portion into said free space created in said step (f) upon radially outward displacement of said ledge by said core.

2. The method claimed in claim 1 including the further step of detentively engaging a surface of said formed closure in such displacement practice of said step (g).

3. The method claimed in claim 1 wherein said step (f) is practiced by effecting mutual movement of molding members defining said second mold cavity.

4. The method claimed in claim 1 wherein said step (g) is practiced in part by applying simultaneously to said formed closure plural stripping forces at locations respectively above said frangible section and below said separable portion thereof.

5. The method claimed in claim 4 wherein the thread forming portion of said core exterior surface is configured with a diameter less than the diameter of the portion of said core exterior surface forming said ledge.

6. The method claimed in claim 5 wherein said core exterior surface is configured such that said thread of said closure is formed at an angle to the axis of said closure less than the angle to said axis of said ledge.

7. A method for making a break-away closure having an upper interiorly threaded portion, a frangible section depending from said upper portion and a separable portion depending axially from said frangible section, said method comprising the steps of:
    (a) defining a first mold cavity conforming to the exterior of said closure upper portion;
    (b) defining a second mold cavity conforming to the exterior of said closure frangible section and separable portion;
    (c) disposing in said first and second mold cavities a core having exterior surface conforming to the interior of said closure, such core surface being inclusive of a surface portion forming ribs and open spaces between said ribs in said frangible section;
    (d) injecting closure-forming matter into said first and second mold cavities to form a closure on said core; and
    (e) creating free space in said second mold cavity at the location of the frangible section and separable portion of a formed such closure radially outwardly of the radially outwardmost dimension of said core; and
    (f) stripping said closure from said core in part by displacing said separable portion into said free space created in said step (e).

8. The method claimed in claim 7 wherein said step (f) is practiced in part by detentively engaging the lowermost surface of said separable portion.

9. The method claimed in claim 7 including the practice of configuring said core with a thread-former portion and with a further former portion for making an interior closure surface for retention of said closure separable portion with a container, with said thread-former portion of diameter less than the diameter of said further former portion.

10. The method claimed in claim 9 wherein said core is further configured such that thread is formed therby at an angle to the axis of said closure less than the angle to said axis at which said interior closure surface is formed.

* * * * *